United States Patent [19]
Schmunk et al.

[11] 3,929,359
[45] Dec. 30, 1975

[54] CONNECTING JOINT STRUCTURE FOR CORRUGATED PLASTIC TUBING

[75] Inventors: John D. Schmunk; James L. Child, Jr.; Robert E. Shroy; John Wise, all of Findlay, Ohio

[73] Assignee: Hancock Brick and Tile Company, Findlay, Ohio

[22] Filed: Nov. 4, 1974

[21] Appl. No.: 520,458

[52] U.S. Cl. ............ 285/401; 285/423; 285/DIG. 4
[51] Int. Cl.² ......................................... F16L 21/00
[58] Field of Search .......... 285/260, 376, 401, 423, 285/391, 376, 360, DIG. 4, 361, 396, 402; 138/109, 121, 122, 173, 177

[56] References Cited
UNITED STATES PATENTS

| | | | |
|---|---|---|---|
| 3,162,470 | 12/1964 | Davidson et al. | 285/376 X |
| 3,695,643 | 10/1972 | Schmunk | 285/DIG. 4 |
| 3,785,682 | 1/1974 | Schaller | 285/DIG. 4 |
| 3,825,288 | 7/1974 | Maroshak | 285/DIG. 4 |

FOREIGN PATENTS OR APPLICATIONS

| | | | |
|---|---|---|---|
| 905,004 | 2/1954 | Germany | 285/401 |

*Primary Examiner*—Dave W. Arola
*Attorney, Agent, or Firm*—Fay & Sharpe

[57] ABSTRACT

The specification and drawings disclose a connecting joint construction particularly suited for use on large diameter corrugated plastic piping. In the embodiment illustrated, the joint is made up of a first main length of corrugated, generally cylindrical plastic pipe having one end portion provided with corrugations which, considered from the interior of the pipe, are somewhat smaller in height than the corrugations of the main body portion of the pipe. The smaller corrugations have a plurality of sets of axially aligned grooves formed therein. A second main length of pipe is provided with a smooth walled end portion of a diameter less than the minimum internal diameter of the end portion of the first pipe. Cleats extend outwardly from the smooth diameter end portion and are sized so that they can be slid longitudinally into the grooves in the first pipe and rotated into a corrugation to lock the two pipe sections together. The joint structure is designed such that the minimum flow area through the joint is not substantially less than the minimum flow area through the remainder of the pipe. Additionally, the overall outer diameter of the joint is substantially equal to the outer diameter of the remaining sections of the pipe.

8 Claims, 5 Drawing Figures

CONNECTING JOINT STRUCTURE FOR CORRUGATED PLASTIC TUBING

BACKGROUND OF THE INVENTION

The subject invention is directed toward the art of pipe joints and couplings and, more particularly, to a joint construction or assembly particularly suited for corrugated plastic pipe or tubing.

The invention is particularly suited for connecting large diameter corrugated plastic drain piping and will be described with particular reference thereto; however, as will become apparent, the joint structure could be incorporated in the many sizes of corrugated piping used for a variety of purposes.

Corrugated plastic pipe or tubing is widely used for various types of agricultural and industrial drainage systems. The pipe is made up in a variety of diameters and lengths which are joined together by many different types of joints and connections. In the smaller sizes, various types of connections are provided which rely upon the inherent resiliency of the plastic to permit interconnection of lengths of the pipe. Connections which rely upon the inherent resiliency of the plastic are not particularly suited to the large diameter sizes of the pipe. The reason for this is that the force required to move the pipe joints into interlocking relationship can be substantial in the large sizes. Additionally, the large size pipes must be made up in shorter lengths necessitating a large number of joints for a given length. In some instances, it has been proposed to provide a separate connecting element to encircle the adjoining ends of the pipe. However, the addition of a separate element can substantially increase the cost of the piping system. Moreover, time and labor involved in installing the separate element can become substantial.

BRIEF DESCRIPTION OF THE INVENTION

Accordingly, a primary object of the present invention is the provision of a joint structure in which the mating components of the structure can be integrally formed on end portions of the pipe elements and which joint is simple to assemble with a minimum of force required. Moreover, it is an object of this invention to provide a joint of the type described which provides a relatively strong positive interconnection.

In accordance with the subject invention, there is provided a joint structure for corrugated plastic pipe comprising a first length of corrugated pipe having a generally cylindrical shape and an internal wall surface which is defined by adjacent circumferentially extending, longitudinally spaced peaks and valleys. The internal diameter of the main portion of the first length measured diametrically between opposite peaks is equal to $d$, and the internal diameter measured diametrically between opposite valleys is equal to D with D being substantially greater than d. The first length includes a first portion which defines an end of the length and has an internal diameter $j$ measured diametrically between opposed peaks which is larger than $d$ but less than D and a maximum internal diameter measured diametrically between opposed valleys which is substantially equal to D. In the two peaks adjacent the outer end of the second portion, there are a plurality of sets of longitudinally aligned grooves. A second length of hollow plastic piping having a main, generally cylindrical portion and a smooth-walled cylindrical second portion is releasably connected to the first length by the smooth-walled second portion which defines an end of the second length and has an outer diameter which is slightly less than $j$ but greater than d and an inner diameter which is substantially equal to d. Additionally, cleat members are provided on the smooth-walled second portion to extend outwardly from its outer surface. The cleats have a location and configuration to permit them to move longitudinally into the aligned grooves in the first portion of the first length. With the cleats of the second length being located in valleys of the first portion of the first length, a slight rotation to move the cleats out of alignment with the grooves releasably locks the two pipe sections together. The rotation is limited by stop bridges across the second valley in the female end of the tubing. There are two of these stop bridges and they limit rotation to approximately 75° thus preventing separation which could occur if rotation would be 90°.

Preferably, and in accordance with a more limited aspect of the invention, stop members are positioned in the valleys between circumferentially adjacent grooves so that the rotation is limited to prevent the cleats from moving into alignment with the next set of grooves. The stop members are preferably formed integrally with the pipe and positioned closely adjacent the groove so that the maximum amount of rotation can be achieved before the stops are engaged.

OBJECTS OF THE INVENTION

Accordingly, a primary object of the present invention is the provision of a joint structure for corrugated plastic piping which permits lengths of the pipe to be rapidly joined manually to provide a connection which can resist substantial longitudinal load.

Yet another object is the provision of a joint or connection of the general type described which can be easily disconnected if desired.

A still further object is the provision of a joint structure for plastic pipe which permits connection of pipe lengths without the use of additional elements.

A still further object is the provision of a joint structure of the type described wherein the minimum cross-sectional flow area through the joint is substantially equal to the minimum cross-sectional area through the pipe.

A still additional object is the provision of a joint structure of the type described wherein the joint has the ability to carry greater compressive loads than the main body of the pipe lengths.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
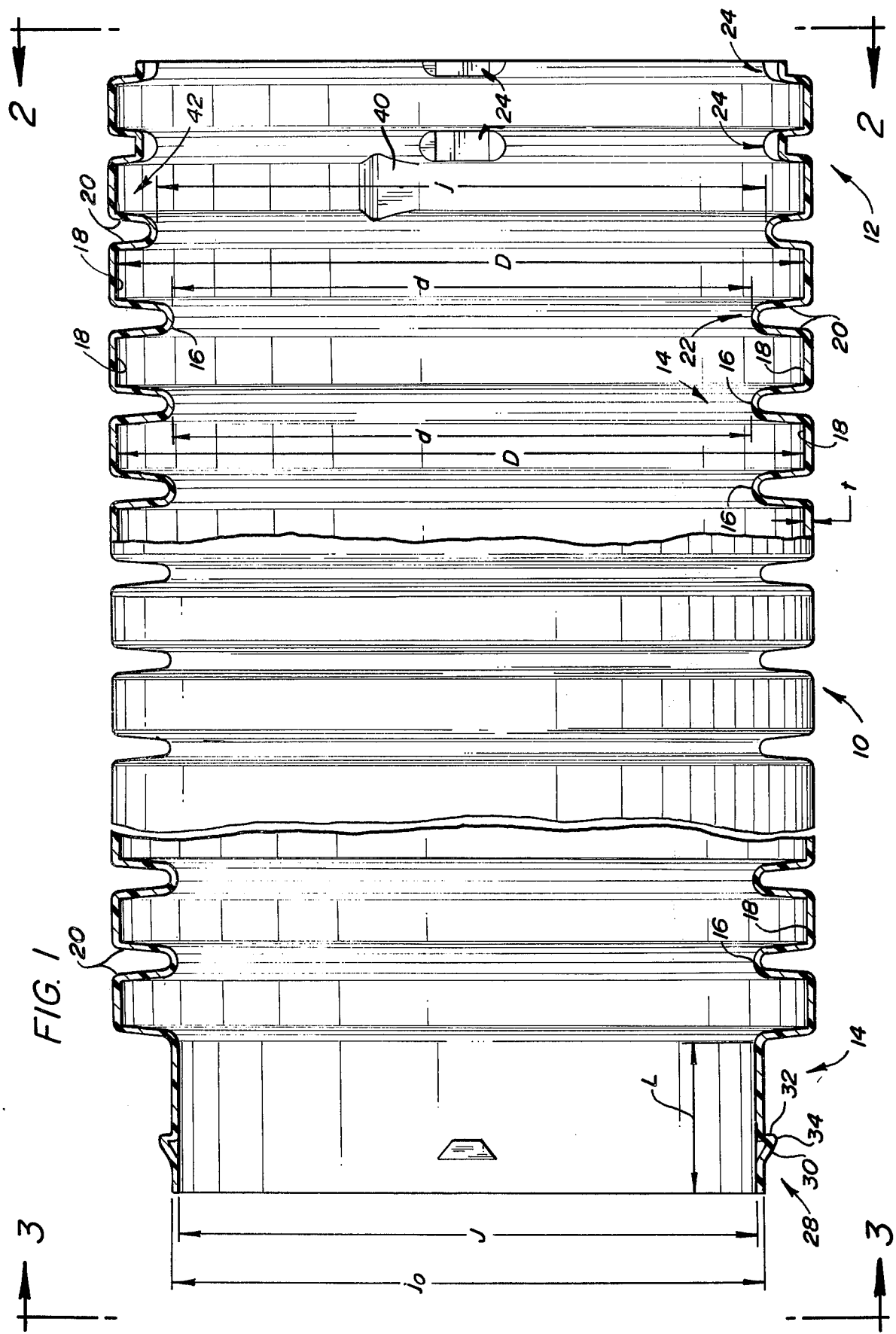
FIG. 1 is a view, partially in section, showing a preferred form of pipe length which incorporates features of the invention.

Referring more particularly to the drawings, FIG. 1 shows the overall preferred construction for a length of plastic pipe 10 which is arranged so that it can be used in conjunction with other such sections of pipe to form connections or joints in accordance with the invention. The main body of pipe 10 is formed from plastic by conventional molding techniques, such as blow molding or continuous extrusion. The particular plastic from which the pipe is formed is not critical to the invention and several different plastics such as high-density polyethylene and polyvinylchloride could be used.

The pipe is corrugated substantially throughout its length and terminates in first and second end portions of sections 12 and 14. In the central section of the pipe, the corrugations 14 are relatively uniformly spaced and, when considered from the interior of the pipe, comprise peaks 16 separated by valleys 18. The corrugations extend circumferentially about the pipe. It should be noted that in the subject embodiment, the peaks 16 are of arcuate shape and the valleys are preferably relatively flat. The side walls 20 which join the peaks 16 to the valleys 18 are preferably slightly inclined.

In the embodiment disclosed, the minimum internal diameter of the pipe is the diametrical distance d measured between opposed peaks 16. The maximum internal diameter D is the diametrical distance between opposed valleys 18. In the central section of the pipe 10, the wall of the pipe is comparatively thin and has a thickness t in the range of 0.080 inch – 0.120 inch.

Figure 2:
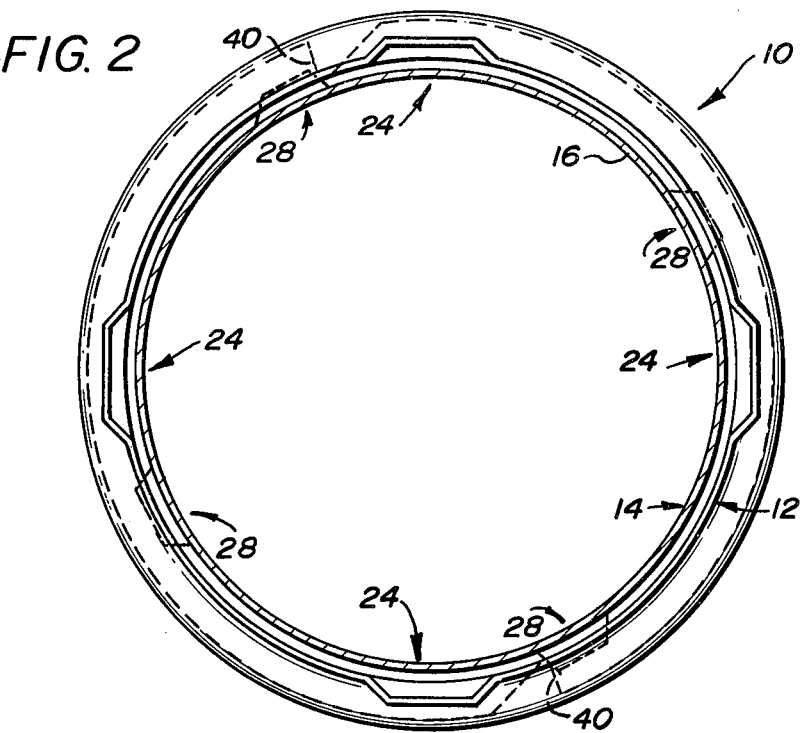
FIG. 2 is an end view of the pipe length of FIG. 1 taken on line 2—2 of FIG. 1 but showing a section of corresponding pipe length connected thereto.

An aspect of comparative importance to the subject invention is the arrangement of the end portion 12 of the pipe 10. As can be noted, the final three corrugations 22 have a minimum internal diameter $j$ which is less than D but greater than $d$. The maximum internal diameter of the end portion 12 is, however, preferably substantially equal to D. The maximum outer diameter of the end section 12 is preferably equal to the diameter of the main body of pipe 10. As best shown in FIG. 2, the outermost of the corrugations 22 are provided with a plurality of sets of longitudinally aligned notches or grooves 24. For reasons which will subsequently be discussed, it is preferable that there be at least two sets of the aligned grooves 24. In the subject embodiment, there are four sets radially spaced apart at approximately 90°. It should be noted that the grooves 24 have a somewhat trapezoidal cross-section when viewed in FIG. 2.

Referring to the left hand end of FIG. 1, it will be noted that the pipe 10 terminates at this end in a smooth-walled, non-corrugated portion 14. The internal diameter J of the smooth-walled portion 14 is, preferably, substantially equal to the minimum internal diameter d of the main body section of the pipe 10. The outer diameter $j_o$ is slightly larger than d but smaller than $j$. The length L of section 14 is, in the subject embodiment, slightly greater than the longitudinal spacing between adjacent peaks of corrugations 22. Although this length can vary substantially, it preferably is of a length nearly equal to twice the spacing of adjacent peaks 22.

Figure 3:
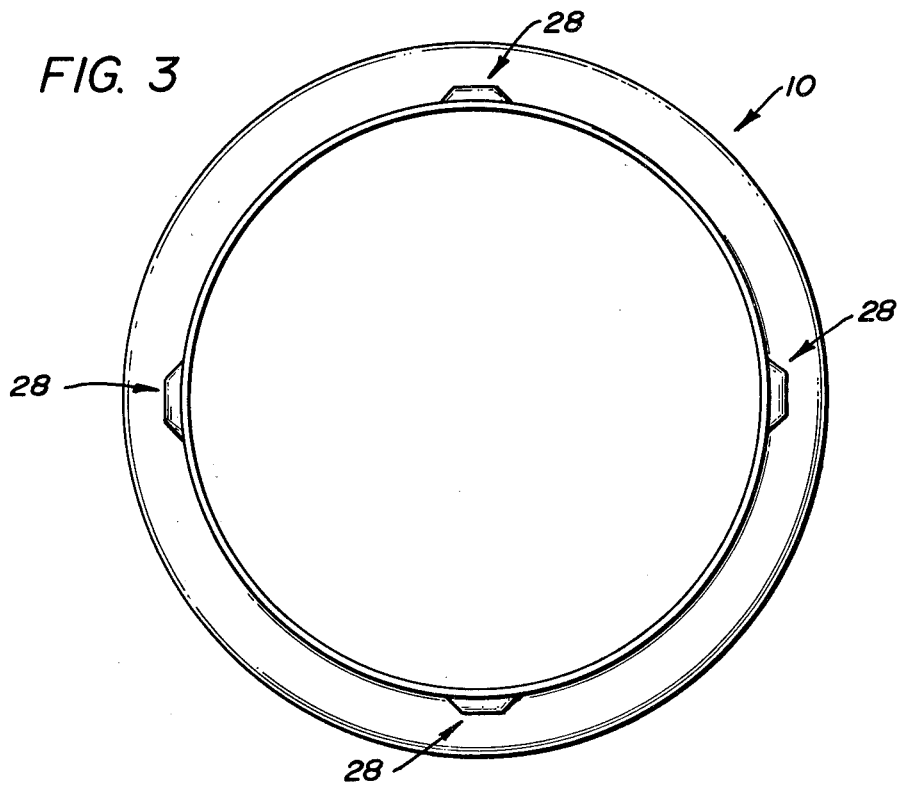
FIG. 3 is an end view of the pipe length of FIG. 1 taken on line 3—3 of FIG. 1.

Located adjacent the outer free end of section 14 are a plurality of cleat members 28. The cleat members 28 are sized and located such that they can be moved longitudinally into the sets of aligned grooves 24. As best shown in FIG. 3, there are four of the cleats 28 located circumferentially about the section 14 and radially spaced approximately 90° apart in the manner of the groove sets 24. The cleats 28 have a shape as viewed in a plane perpendicular to the axis of the pipe, which is trapezoidal and corresponds to the shape of the grooves 24 (see FIG. 3). It should, of course, be understood that the size of the cleats is such that they can freely slide longitudinally into the groove sets 24.

In a plane parallel to the longitudinal axis of pipe 10, the cleats have a configuration which is defined by two surfaces 30 and 32 (see FIG. 1). Surface 30 is preferably inclined in the manner shown and joins surface 32 at an apex 34. Surface 32 is preferably substantially perpendicular to the outer surface of section 14 (i.e., surface 32 is generallly in a plane perpendicular to the longitudinal axis of pipe 10).

Figure 4:
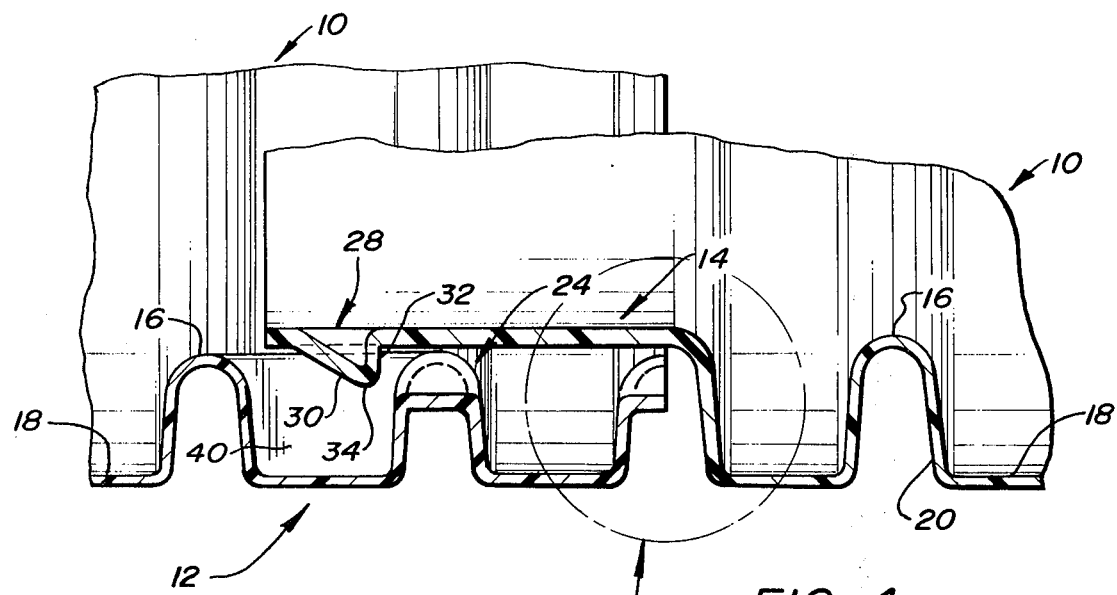
FIG. 4 is an enlarged cross-sectional view showing a joint connection formed in accordance with the invention and made up with pipe lengths formed in the manner shown in FIG. 1; and, FIG. 5 is an enlarged cross-sectional view of the circled area of FIG. 4.

Because of the arrangement of the end sections 12 and 14, any number of the pipes 10 can be rapidly joined to form a pipe system of any desired length. FIG. 4 illustrates in enlarged cross-sectional view a joint formed between two lengths of pipe 10. As shown, the second end portion or section 14 of one length is moved axially into the first end portions or section 12 of an adjacent pipe. Note that the arrangement of the cleats 28 is such that they are freely slidable into the groove sets 24. Additionally, the cleats 28 are located on the section 14 at a longitudinal position such that when fully moved into the grooves, the cleats lie between adjacent peaks. After being moved into proper relative position in a longitudinal direction, a slight rotation of either of the two lengths of pipe causes the cleats to move out of alignment with the notches or grooves 24. The configuration of the notches 28 is such that the inclined face 30 permits the inward longitudinal sliding movement to take place freely even when the pipes are tilted slightly out of axial alignment. Similarly, the inclined end faces of the cleats facilitates rotational movement of the cleats in the valleys. The relatively perpendicular face 32 provides a positive lock behind the adjacent corrugation 22. This prevents axial separation of the joined pipes until the cleats 28 are rotated into alignment again with the groove sets 24.

In order to prevent the cleats 28 from being inadvertently rotated an amount sufficient to bring them back into alignment with the next adjacent set of grooves, stop bridges or members 40 are formed within the second valley portion 42. As best seen in FIGS. 1, 2 and 4, according to the preferred embodiment the stop members or bridges 40 are located 180° apart on diagonally opposite sides of the tubing. The stop bridges 40 are preferably positioned closely adjacent the diagonally opposite sets of grooves 24 such that when the smooth-walled portion is inserted within the corrugated portion, clockwise movement of the smooth-walled portion will be permitted until the cleats engage the stop portion after a maximum amount of rotation (i.e., immediately before the cleats would move back into alignment with the next adjacent set of grooves). FIG. 2 shows this relationship.

Figure 5:
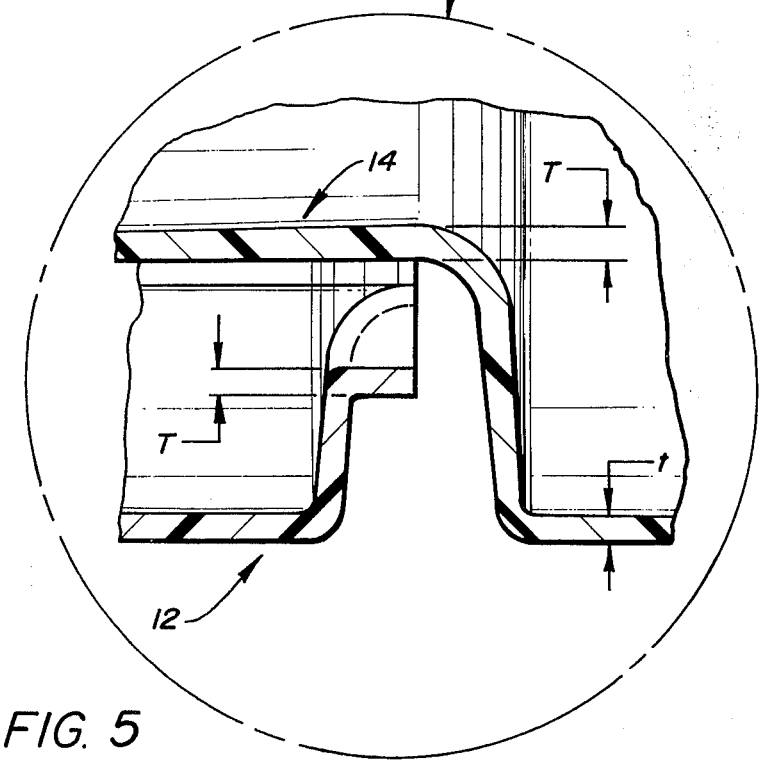

Preferably, as best shown in FIG. 5, wall thickness T of the end sections 12 and 14 is slightly greater than the wall thickness $t$ of the main bodies of the pipes 10. FIG.

5 illustrates a gradual transition from the thickness $t$ to the thickness $T$ of the end sections. The thickness $t$ is preferably selected so that the main body of the pipe has adequate strength to resist the normal crushing or compressive forces which will be encountered. By increasing the thickness of the end sections 12 and 14, the necessary strength can be assured in the joint without increasing the overall thickness and consequently the weight of the entire pipe. Preferably, the wall thickness of each of the first and second sections which make up similar joints are slightly greater than the wall thickness of the main body of the pipe.

The invention has been described in great detail sufficient to enable one of ordinary skill in the art to make and use the same. Obviously, modifications and alterations of the preferred embodiment will occur to others upon a reading and understanding of the invention. It is our intention to include all such modifications and alterations as part of our invention insofar as they come within the scope of the appended claims.

What is claimed is:

1. A joint construction for plastic pipe comprising:
 a first main length of corrugated, hollow and generally cylindrical plastic pipe having an internal wall surface defined by adjacent circumferentially extending, longitudinally spaced peaks and valleys; the internal diameter of said first length measured diametrically between opposite peaks being equal to $d$, and the internal diameter measured diametrically between opposite valleys being equal to $D$, with $D$ being substantially greater than $d$;
 said first length including a first portion which defines an end of said length and having an internal diameter $j$ measured diametrically between opposed peaks which is greater than $d$ but less than $D$, and a maximum internal diameter measured diametrically between opposed valleys which is substantially equal to $D$, and a plurality of sets of longitudinally aligned grooves formed in at least the two peaks adjacent the outer end of said first portion;
 a second main length of hollow plastic pipe having a generally cylindrical corrugated portion and a smoothwalled cylindrical second portion which defines an end of said second length and has an outer diameter which is slightly less than $j$ but greater than $d$ and an inner diameter $J$ which is substantially equal to $d;$ and,
 cleat members extending outwardly from the outer surface of said second portion of said second length, said cleats having a configuration and location to permit them to move longitudinally into the aligned grooves in the first portion of said first length, the portion of said second length being received in said first portion of said first length with the cleats of said second portion of said second length being located in valleys of the first portion of said first length and in a non-aligned position relative to said grooves.

2. The joint construction as defined in claim 1 wherein the wall thickness of said first portion is greater than the wall thickness of said first main length and the wall thickness of said second portion is greater than the wall thickness of said second main length.

3. The joint construction as defined in claim 1 wherein said first portion of said first length includes at least three corrugations.

4. The joint construction as defined in claim 1 wherein said cleats are all spaced inwardly a uniform distance from the outer end of said second portion of the second length.

5. The joint construction as defined in claim 1 wherein said cleats are defined by first and second surfaces with said first surface being inclined and facing in the direction of the outer end of the second portion of said second length and said second surface being generally perpendicular to the wall of said second portion of said second length and joining said first surface at an apex.

6. The joint construction as defined in claim 1 wherein said cleats are located at relatively uniform circumferential spacings.

7. The joint construction as defined in claim 1 including stop members located in valleys of the first portion of said first length to limit the rotational movement of said cleat members and said valleys.

8. The invention as defined in claim 7 wherein said stop members are positioned closely adjacent said grooves.

* * * * *